Patented Dec. 26, 1950

2,535,245

UNITED STATES PATENT OFFICE 2,535,245

PROCESS FOR PREPARING ACRYLAMIDE

Cyrus A. Weisgerber, Wilmington, Del., assignor to Hercules Powder Company, Wilmington, Del., a corporation of Delaware No Drawing. Application December 11, 1948, Serial No. 64,897

5 Claims. (Cl. 260—561)

This invention relates, in general, to a hydrolyzing process and, in particular, to a process for hydrolyzing acrylonitrile to acrylamide.

In recent years acrylamide has become a relatively valuable monomer for use in preparing synthetic polymers and, accordingly, it is advantageous to provide new and commercially feasible methods for the preparation of this raw material. Inasmuch as the presently available methods for the preparation of acrylamide have frequently involved either difficult procedures or the embodiment of relatively unavailable starting materials or, in numerous cases, may tend to produce partially polymerized acrylamide, it is highly desirable to provide a process for the preparation of monomeric acrylamide which utilizes convenient chemical reactions applied to readily available chemical compounds.

Now in accordance with the present invention, acrylonitrile is hydrolyzed to acrylamide in a procedure comprising simultaneously hydrolyzing and hydrohalogenating acrylonitrile to $\beta$-chloropropionamide hydrochloride, which compound in turn is treated with strong alkali solution to give acrylamide, followed by isolation of substantially monomeric acrylamide. According to the preferred form of the invention, isolation of the intermediate $\beta$-chloropropionamide or its hydrochloride is not required and, thus, the second step of the reaction is applied directly to the reaction mixture resulting from the first step of the reaction. The isolation of the acrylamide product is accomplished by adjusting the pH of the final reaction mixture to between about 8 and about 11, preferably about 10, adding a polymerization inhibitor, and recovering the acrylamide in substantial absence of polymers.

The general nature of the invention having been set forth, the following examples are given in illustration but not in limitation of specific procedures of the process of the invention.

Example 1

A mixture was prepared of 265 parts of acrylonitrile in 150 parts of water and into this mixture anhydrous hydrogen chloride was introduced below the surface while the mixture was thoroughly agitated. During the introduction of the hydrogen chloride the temperature was maintained at about 50° C. by cooling until 297 parts by weight of hydrogen chloride had been absorbed by the mixture. At the end of this time the reaction mixture exhibited a tendency to cool and, accordingly, the cooling bath which had been utilized to maintain the temperature at about 50° C. was replaced by a heating bath to maintain the temperature at about 45° C. The mixture was maintained at about 45° C. for 35 minutes while hydrogen chloride was passed therethrough and then the entire reaction mixture was cooled to 30° C. and 250 parts of water was added to prevent crystallization of the $\beta$-chloropropionamide hydrochloride which had been formed by this first step of the process. A total of 361.5 parts of hydrogen chloride had been absorbed by the reaction mixture.

To the aqueous mixture containing principally $\beta$-chloropropionamide hydrochloride was added 778 parts of 50.9% aqueous sodium hydroxide solution, the caustic solution being added slowly over a period of about 70 minutes at a temperature of about 25° C. After the caustic solution had been added, the mixture was stirred for about one hour and was then filtered to separate from the solution the sodium chloride which had crystallized therefrom. The crystallized sodium chloride was washed with a small amount of cold water and 2 parts of tert-butyl catechol was added to the filtrate which had a pH of 10.1. The filtrate was then extracted continuously with methylene chloride for about 28 hours and acrylamide was obtained from the methylene chloride extracting liquor by cooling and partial evaporation. A total of 214.5 parts of acrylamide corresponding to 60.4% yield was obtained.

Example 2

A mixture was prepared containing 530.6 parts acrylonitrile and 300 parts concentrated hydrochloric acid and was stirred rapidly for about 2½ hours while anhydrous hydrogen chloride was bubbled rapidly into the mixture. During the hydrogen chloride addition the temperature was maintained at about 50° C. by cooling. At the end of this time 250 parts of methanol was added to the solution and 1455 parts of 48.3% aqueous sodium hydroxide solution was then added at a temperature below about 30° C. During the addition of the sodium hydroxide solution, sodium chloride was crystallized out and was separated from the solution by filtration followed by washing with 350 parts of methanol. Five parts of hydroquinone was added to the solution, and water and methanol were removed by azeotropic distillation with 1500 parts of ethylene dichloride at atmospheric pressure. During the removal of water and methanol there was little, if any, evidence of polymerization of the acrylamide. Acrylamide was separated from the dry ethylene dichloride solution to yield 425.5 parts by weight of acrylamide corresponding to about 60% conversion of acrylonitrile.

The essential reactions characterizing this process are the simultaneous hydrolysis and hydrohalogenation of acrylonitrile to yield β-chloropropionamide hydrochloride which is present as an intermediate product in the reaction but which, according to the preferred embodiment of the invention, need not be separated from the reaction mixture. The reaction mixture containing the β-chloropropionamide hydrochloride is then treated with strong alkali to neutralize the hydrochloric acid and also to accomplish dehydrohalogenation yielding acrylamide. From this reaction mixture monomeric acrylamide is isolated.

It has been found that critical control of reaction conditions is necessary in order to cause the proper reactions rather than side reactions to take place, and to prevent significant polymer formation. Thus, the first step of the reaction comprising the introduction of hydrogen chloride should be carried out in the presence of a slight molecular excess of water, for example, between about 1.0 and about 2.0 and preferably between about 1.1 and about 1.4 molecular parts water for each molecular part acrylonitrile, this treatment with hydrogen chloride being continued until about 2 molecular parts hydrogen chloride is utilized for each molecular part acrylonitrile. Likewise, the reaction temperature during this step of the reaction should be maintained somewhat above room temperature but considerably below 100° C., preferably between about 40° and about 70° C. and usually between about 45° and about 60° C.

After the hydrolysis step of the reaction to form the intermediate β-chloropropionamide which is present in the form of its hydrochloride, a solvent for the amide hydrochloride such as, for example, water or methanol or, optionally, a dispersing liquid such as, for example, a liquid hydrocarbon, is added to aid subsequent reaction of the β-chloropropionamide hydrochloride.

The second step of the process; namely, the neutralization and formation of the acrylamide, is carried out by the addition to the reaction mixture of a measured amount of strong alkali such as, for example, strong sodium hydroxide, at a temperature under about 35° C. and preferably under 30° C., for example, a temperature between about 20° and about 30° C. The alkali, for example, sodium hydroxide, is added slowly, avoiding rapid addition with consequent formation of high alkalinity, and is added until an amount almost exactly equivalent to the amount of hydrogen chloride is present in the reaction mixture. During this step, sodium chloride is formed by neutralization and is then separated from the reaction mixture, leaving in solution a substantial yield of the desired, readily polymerizable acrylamide. This monomeric acrylamide may be recovered according to a convenient procedure such as, for example, solvent extraction, crystallization, or the like, in the presence of a polymerization inhibitor and under carefully controlled conditions to prevent polymerization. Inasmuch as procedures for isolating acrylamide from such a mixture require a significant duration of time, and inasmuch as the acrylamide is readily subject to polymerization under normal isolation conditions, isolation of acrylamide in the monomeric state requires critical operation.

In order to prevent an undesirably large degree of polymerization of acrylamide during the isolation steps, and the like, it is necessary to combine two essential and critical measures of inhibition: a selected polymerization inhibitor must be employed, and careful pH control must be maintained at all times. The situation is further complicated by the mutually incompatible facts that separation of acrylamide from acidic components such as, for example, isolation of acrylamide from its hydrochloride, is desirably accomplished under alkaline conditions, whereas free acrylamide tends strongly to polymerize under these same alkaline conditions. Thus, in order to isolate the acrylamide in substantial absence of polymeric materials it has been found that the isolation must be carried out at a pH between about 8 and about 11, preferably about 10, and simultaneously in the presence of a polymerization inhibitor such as, for example, tert-butyl catechol, hydroquinone, or the like.

Instead of the acrylonitrile utilized as a starting material in the specific examples contained herein, there may be substituted the closely-related α-methyl compound; namely, α-methacrylonitrile which is simultaneously hydrochlorinated and hydrolyzed to the corresponding intermediate compound which in turn is treated to yield α-methacrylamide. The process for treating the α-methyl compound is carried out according to substantially similar conditions and controls so that the α-methyl compound may be substituted directly in the procedures of the specific examples.

By proceeding according to this invention, there is available an easy and convenient method for the preparation of monomeric acrylamide or methacrylamide in the substantial absence of the polymerized amide utilizing as a starting material the readily and conveniently available nitrile.

What I claim and desire to protect by Letters Patent is:

1. A process for preparing a compound selected from the group consisting of acrylamide and methacrylamide comprising treating the corresponding nitrile with hydrogen chloride in an amount of at least two molecular parts hydrogen chloride for each molecular part of the nitrile in the presence of between 1.0 and 2.0 molecular parts water for each molecular part nitrile and treating the resulting reaction mixture at a temperature under 35° C. with strong aqueous caustic solution.

2. A process for preparing acrylamide comprising treating acrylonitrile with hydrogen chloride at a temperature between about 40° and 70° C. in an amount of about two molecular parts hydrogen chloride for each molecular part of acrylonitrile in the presence of between 1.0 and 2.0 molecular parts water for each molecular part acrylonitrile, thereby forming β-chloropropionamide hydrochloride, and treating the resulting reaction mixture at a temperature under 35° C. with strong aqueous caustic solution in an amount substantially equivalent to the amount of hydrogen chloride utilized in the previous step.

3. A process for preparing monomeric acrylamide comprising treating acrylonitrile with hydrogen chloride at a temperature between about 45° and 60° C. in an amount of about two molecular parts hydrogen chloride for each molecular part of acrylonitrile in the presence of between 1.1 and 1.4 molecular parts water for each molecular part acrylonitrile, thereby forming β-chloropropionamide hydrochloride, treating the resulting reaction mixture at a temperature between 20° and 30° C. with strong aqueous caustic solution in an amount substantially equivalent to the amount of hydrogen chloride utilized in the previous step, adjusting the pH of the resulting aqueous acrylamide solution to between about 8 and about 11, adding a polymerization inhibitor and recovering monomeric acrylamide therefrom.

4. In a process for preparing monomeric acrylamide wherein acrylamide is formed in aqueous medium the steps comprising adjusting the pH of the mixture to between about 8 and about 11, adding thereto a small amount of a polymerization inhibitor selected from the group consisting of tertiary butyl catechol and hydroquinone, and recovering acrylamide therefrom.

5. In a process for preparing monomeric acrylamide wherein acrylamide is formed in aqueous medium the steps comprising adjusting the pH of the mixture to about 10, adding thereto a small amount of tertiary butyl catechol, and recovering acrylamide therefrom.

CYRUS A. WEISGERBER.

REFERENCES CITED

The following references are of record in the file of this patent:

UNITED STATES PATENTS

| Number | Name | Date |
|---|---|---|
| 1,851,040 | Fikentscher et al. | Mar. 29, 1932 |
| 2,140,469 | Crawford et al. | Dec. 13, 1938 |
| 2,288,197 | Kranzlein et al. | June 30, 1942 |
| 2,451,436 | Erickson | Oct. 12, 1948 |

FOREIGN PATENTS

| Number | Country | Date |
|---|---|---|
| 885,738 | France | June 7, 1943 |